US009292293B2

United States Patent
Park et al.

(10) Patent No.: US 9,292,293 B2
(45) Date of Patent: Mar. 22, 2016

(54) INTELLIGENT MULTICORE CONTROL FOR OPTIMAL PERFORMANCE PER WATT

(71) Applicant: QUALCOMM Incorporated, San Diego, CA (US)

(72) Inventors: Hee-Jun Park, San Diego, CA (US); Steven S Thomson, San Diego, CA (US); Ronald Frank Alton, Oceanside, CA (US); Edoardo Regini, San Diego, CA (US); Satish Goverdhan, San Diego, CA (US); Pieter-Louis Dam Backer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 230 days.

(21) Appl. No.: 14/074,908

(22) Filed: Nov. 8, 2013

(65) Prior Publication Data

US 2015/0046685 A1    Feb. 12, 2015

Related U.S. Application Data

(60) Provisional application No. 61/863,554, filed on Aug. 8, 2013.

(51) Int. Cl.
*G06F 1/32*    (2006.01)
*G06F 9/38*    (2006.01)
(Continued)

(52) U.S. Cl.
CPC ............... *G06F 9/38* (2013.01); *G06F 1/3243* (2013.01); *G06F 1/3287* (2013.01); *G06F 1/206* (2013.01); *G06F 9/5094* (2013.01)

(58) Field of Classification Search
CPC ................ G06F 1/32; G06F 1/28; G06F 1/26

USPC ......... 713/300, 310, 320, 321, 322, 323, 324, 713/340, 375
See application file for complete search history.

(56) References Cited

U.S. PATENT DOCUMENTS 6,804,632 B2   10/2004 Orenstien et al.
8,180,997 B2 *  5/2012 Burger et al. ................... 712/15
(Continued)

OTHER PUBLICATIONS

Li J., et al., "Dynamic Power-Performance Adaptation of Parallel Computation on Chip Multiprocessors," The Twelfth International Symposium on High-Performance Computer Architecture, 2006, pp. 77-87.
Li S., et al., "McPAT: An Integrated Power, Area, and Timing Modeling Framework for Multicore and Manycore Architectures," 42nd Annual IEEE/ACM International Symposium on Microarchitecture, 2009, pp. 469-480.
(Continued)

*Primary Examiner* — Jaweed A Abbaszadeh
*Assistant Examiner* — Keshab Pandey
(74) *Attorney, Agent, or Firm* — The Marbury Law Group, PLLC (57) ABSTRACT

The various aspects provide for a device and methods for intelligent multicore control of a plurality of processor cores of a multicore integrated circuit. The aspects may identify and activate an optimal set of processor cores to achieve the lowest level power consumption for a given workload or the highest performance for a given power budget. The optimal set of processor cores may be the number of active processor cores or a designation of specific active processor cores. When a temperature reading of the processor cores is below a threshold, a set of processor cores may be selected to provide the lowest power consumption for the given workload. When the temperature reading of the processor cores is above the threshold, a set processor cores may be selected to provide the best performance for a given power budget.

28 Claims, 8 Drawing Sheets

(51) Int. Cl.
    *G06F 1/20*     (2006.01)
    *G06F 9/50*     (2006.01)

(56) References Cited

U.S. PATENT DOCUMENTS

| | | | | |
|---|---|---|---|---|
| 2008/0244227 | A1* | 10/2008 | Gee et al. | 712/30 |
| 2009/0309243 | A1* | 12/2009 | Carmack et al. | 257/798 |
| 2012/0144217 | A1 | 6/2012 | Sistla et al. | |
| 2012/0266179 | A1* | 10/2012 | Osborn | G06F 9/5077 718/105 |
| 2013/0132972 | A1* | 5/2013 | Sur et al. | 718/105 |
| 2013/0155081 | A1 | 6/2013 | Khodorkovsky et al. | |
| 2014/0229750 | A1* | 8/2014 | Bhandaru et al. | 713/320 |

OTHER PUBLICATIONS

Nathuji R., et al., "VirtualPower: Coordinated Power Management in Virtualized Enterprise Systems," In Proceedings of twenty-first ACM SIGOPS symposium on Operating systems principles, vol. 41, Oct. 2007, pp. 265-278.

Nowroz A.N. et al., "Thermal monitoring of real processors: Techniques for sensor allocation and full Characterization", Design Automation Conference (DAC), 2010 47th ACM/IEEE. Publication Date: Jun. 13-18, 2010, pp. 56-61. ISSN: 0738-100X.

International Search Report and Written Opinion—PCT/US2014/050230—ISA/EPO—Oct. 23, 2014.

\* cited by examiner

INTELLIGENT MULTICORE CONTROL FOR OPTIMAL PERFORMANCE PER WATT

RELATED APPLICATION

This application claims the benefit of priority to U.S. Provisional Patent Application No. 61/863,554 entitled "Intelligent Multicore Control For Optimal Performance Per Watt" filed Aug. 8, 2013, the entire contents of which are hereby incorporated by reference.

BACKGROUND

Currently, manufactures manage power consumption and thermal issues in multicore devices by throttling the processing clock frequency of the multiple processor cores. Throttling the processing clock frequency of multiple processor cores of the multicore devices can help manage power consumption and thermal issues by reducing the rate of work accomplished by the multicore processors. However, this technique focuses on managing these issues at the expense of performance.

Mobile devices are increasingly incorporating multicore processors to handle the demands of the system and application software run concurrently on the mobile devices. Mobile devices are limited by having restricted power budgets that deplete quicker as more power is consumed by the mobile device to achieve higher performance levels, or maintain performance levels while handling greater software processing demands. While the software processing demands are increasing, users expect to maintain a certain level of performance on their mobile devices in terms of processing speed and battery life. Maintaining the user expected level of performance on a mobile device creates a dilemma of whether to sacrifice performance for longevity, or sacrifice longevity for performance, all while managing the thermal issues of the multicore processors.

SUMMARY

The methods and apparatuses of various aspects provide for control of a plurality of processor cores of a multicore integrated circuit including comparing temperature readings of the plurality of processor cores to a temperature threshold, calculating a map for the plurality of processor cores based on processor core information and a plurality of hypothetical cases, identifying a first configuration of processor cores to optimize power consumption for a given workload when the temperature readings are less than the temperature threshold, identifying a second configuration of processor cores to optimize performance for a given power budget when the temperature readings are greater than the temperature threshold, and controlling an activity state for each processor core of the plurality of processor cores based on the identified configuration. In an aspect method, calculating the map for the plurality of processor cores based on the processor core information and the plurality of hypothetical cases may include calculating a power map indicating relationships between power consumption and temperature for combinations of the plurality of processor cores for a given representative value of the given workload when the temperature readings are less than the temperature threshold, and calculating a performance map indicating relationships between power consumption and workload for combinations of the plurality of processor cores for a given temperature when the temperature readings are greater than the temperature threshold.

In an aspect method, the first and second configurations of processor cores may indicate a number of active processor cores. In an aspect method, the first and second configurations of processor cores may indicate which processor cores of the plurality of processor cores are active processor cores. In an aspect method, the first and second configurations of processor cores may include the processor cores with a lowest leakage, a lowest temperature, or a lowest voltage level for a given frequency.

An aspect method may further include reading the processor core information associated with each processor core, in which the processor core information includes a leakage current, a processor core speed, a processor voltage setting table, a maximum clock frequency, a temperature reading, and a current workload, and converting the current workload into a representative value of the current workload. In an aspect method, the processor core information may include dynamic information including the temperature reading and the current workload, and the aspect method may further include repeatedly reading the dynamic information.

In an aspect method, the processor cores of the multicore integrated circuit may include one or more processor core types selected from the group including a central processing unit, a shader processor of a graphics processing unit, a texture pipe of the graphics processing unit, or a digital signal processor.

An aspect includes an apparatus including a multicore integrated circuit having a plurality of processor cores in which the multicore integrated circuit is configured with processor-executable instructions to perform operations of one or more of the aspect methods described above.

An aspect includes an apparatus for multicore control of a plurality of processor cores of a multicore integrated circuit including means for performing functions of one or more of the aspect methods described above.

An aspect includes a non-transitory processor-readable medium having stored thereon processor-executable software instructions configured to cause a multicore integrated circuit to perform operations of one or more of the aspect methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "computing device" refers to any one or all of smart phones, laptop computers, personal computers, servers, tablet computers, palm-top computers, and similar electronic devices which individually include a programmable processor and memory and circuitry for sending signals to an integrated circuit (IC).

As used herein, the term "multicore device" refers to any computing device having an IC/system-on-chip (SoC)/processor with multiple processor cores. The exemplary multicore devices herein are described as having multicore ICs. Describing the multicore devices in terms of multicore ICs is meant to be exemplary and in no way limiting. Descriptions of multicore ICs maybe interchangeable with multicore SoCs and multicore processors (such as central processing units (CPU), graphics processing units (GPU), accelerated processing units (APU), physics processing units (PPU), digital signal processors (DSP), microprocessors, and other programmable logic devices).

As used herein, the terms "silicon leakage," "leakage," "IDDQ," and "leakage current" are used interchangeably and refer to electric current that flows through insulating regions of semiconductors or conduction regions of semiconductors when a device is off. The leakage current grows exponentially with increasing temperature.

Increased power consumption by multicore ICs of multicore devices often results in increased thermal radiation or increased temperature of the multicore ICs, and decreased battery life. When the temperature of a multicore IC rises, it may result in excessive heating and reduce performance of the multicore device by shutting down processors when reaching critical temperatures, lessening the user experience. Increased power consumption may greatly reduce the battery life of a multicore device having a limited power budget, also lessening the user experience. Current thermal and power management in multicore devices may involve throttling or reducing the processor clock frequency of the processor cores. A slower processor clock creates less thermal output and uses less power, but also reduces the throughput of the workload for the processor.

The methods and devices of the various aspects provide alternative ways of managing thermal and power issues in multicore devices by controlling the number of and which processor cores within multicore ICs of multicore devices are used to perform process tasks in order to achieve optimal performance per watt of expended power. Power consumption for the same workload varies depending on the number of active processor cores running the workload due to leakage and dynamic power trends. In the various aspects, the optimal number of active cores for the best performance per watt may be determined based on various factors, such as temperature, speed, leakage, part type, and total workload, for example.

Figure 1A:
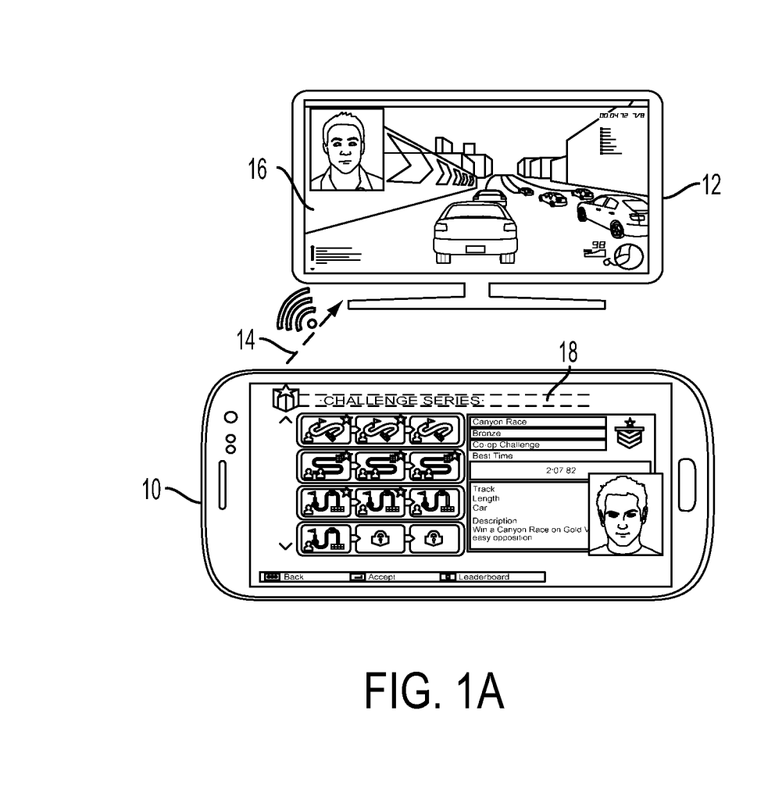
FIG. 1A is a diagram illustrating a multiple video presentation presented by an aspect multicore device on multiple displays.
Figure 1B:
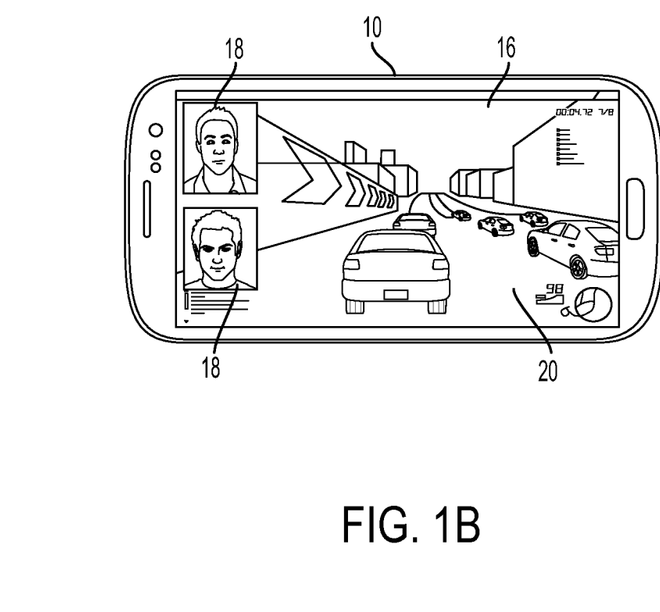
FIG. 1B is a diagram illustrating a multiple video presentation presented by an aspect multicore device on a display of the multicore device.

Concurrent multimedia processes on multicore devices require considerable power profiles for multicore devices with limited power budgets. Examples of such multimedia processes include graphics, physics, video, image, audio, and communications processing for one or more outputs on one or more devices. FIGS. 1A and 1B illustrate an exemplary multicore device 10 (e.g. a smartphone) running concurrent multimedia processes. In FIG. 1A, the multicore device 10 may connect to a display device 12, over a wireless (or wired) connection 14. The multicore device 10 may transmit the data for the display of a multimedia process output 16. For example, the multicore device 10 may transmit data that may be used to display video game graphics in 1080 p resolution at 60 frames per second (fps). The display device 12 may use the data received over the wireless connection 14 from the multicore device 10 to present the multimedia process output. In this example, the display device 12 may be any computing device, a connected television or monitor, or another multicore device. Concurrently, the multicore device 10 may present a different multimedia process output 18. For example, the multicore device 10 may present a different game scene, a communication interface, a game controller, or a game, application or mobile device user interface, which may have different complexity than the multimedia process output presented on the display device 12. Both the multicore device 10 and the display device 12 may display one or more further images or videos of the user's opponent and/or the user of the multicore device 10, for example.

The example shown in FIG. 1B illustrates that the multicore device 10 may be capable of concurrently presenting multiple multimedia process outputs. In this example, the multicore device 10 may concurrently present the multimedia process output 16 and one or more different multimedia process outputs 18 on a display 20 of the. The multimedia process output 16 may include, for example, video game graphics in 1080 p resolution at 60 fps, and the one or more different multimedia process outputs 18 may include, for example, videos of the user's opponent and/or the user in 1080 p resolution at 30 fps. The display 20 may be implemented by a variety of known display technologies and support a range of resolutions and refresh rates. In the examples illustrated in both FIGS. 1A and 1B, the multicore device 10 and the display device 12 may present other multimedia process outputs, such as audio portions of the video game and/or communications between the user and the opponent. The multicore device 10 may also provide haptic feedback, such as vibrations related to the presentation. The workload of the multicore device 10 to process all of the multimedia processes and to present the outputs involved in these examples may result in significant increases in thermal output and power consumption by the multicore ICs.

Figure 2A:
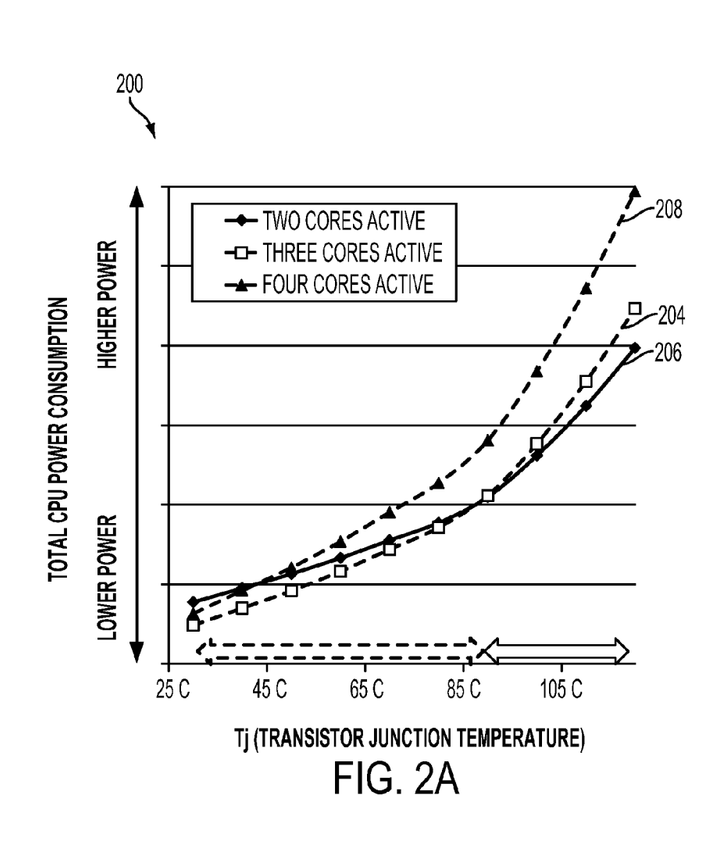
FIG. 2A is a graph illustrating variances in power consumption and thermal output for a constant workload processed by typical parts on an aspect multicore device.
Figure 2B:
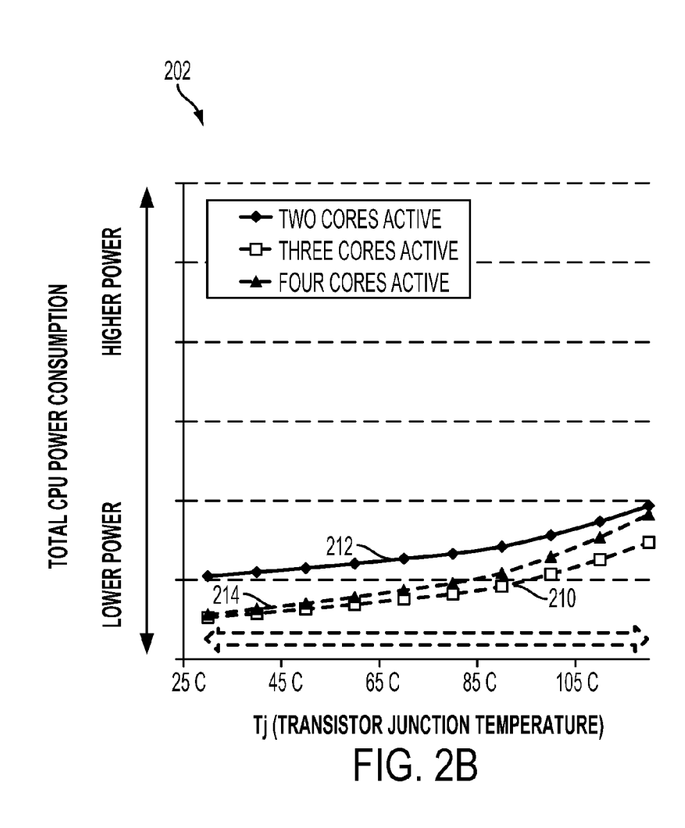
FIG. 2B is a graph illustrating variances in power consumption and thermal output for a constant workload processed by slow parts on an aspect multicore device.

The graphs in FIGS. 2A and 2B illustrate variances in power consumption for a constant workload processed by typical and slow parts on multicore devices at various temperature levels. The amount of workload can be measured and indicated as MIPS, which stands for Million of Instructions per Second. In a large production run, each multicore IC may have slightly different physical and performance characteristics due to intrinsic, natural variations in the multicore IC's component materials, which may introduce variability in the processing speed and thermal performance of each multicore IC in the batch. The variations in performance may result in a multicore IC being categorized as a fast, typical/nominal, or slow multicore IC. Variations in performance may also result from core-to-core differences in a multicore IC, processors and/or cores constructed with different capabilities and/or for different purposes, and workload distribution. Even when cores have the same circuit design, characteristics of the cores on the same Si die may vary for several reasons, such as an Si manufacturing range, dynamic temperature changes according to workload difference, heat dissipation difference due to core location, and heat conduction from other function blocks nearby on the Si die floorplan. The performance achieved by multicore ICs also depends upon the transistor junction temperature. The graphs in FIGS. 2A and 2B represent cases of typical and slow multicore ICs having two, three, and four active processor cores, respectively. The graph 200 depicting the performance of the typical multicore ICs shows how an exemplary multicore IC may be optimally run (e.g. use the least power) to execute the constant workload with three active processor cores, line 204, when their temperature is between approximately 25 degrees Celsius and 90 degrees Celsius. Above approximately 90 degrees Celsius, the same multicore IC may be optimally run to execute the constant workload with two active processor cores, line 206. In this example, it may not be optimal for this exemplary multicore IC to activate a fourth processor core to process the same amount of workload, line 208, in the shown temperature range. For an exemplary slow multicore IC, within the same temperature range, the graph 202 shows that it may be optimal to process the constant workload with three active processor cores, line 210, rather than two active processor cores, line 212, or four active processor cores, line 214. The optimal number of active cores for the lowest power consumption may vary depending on temperature, IC speed, and amount of workload (MIPS or MHz required).

Figure 3:
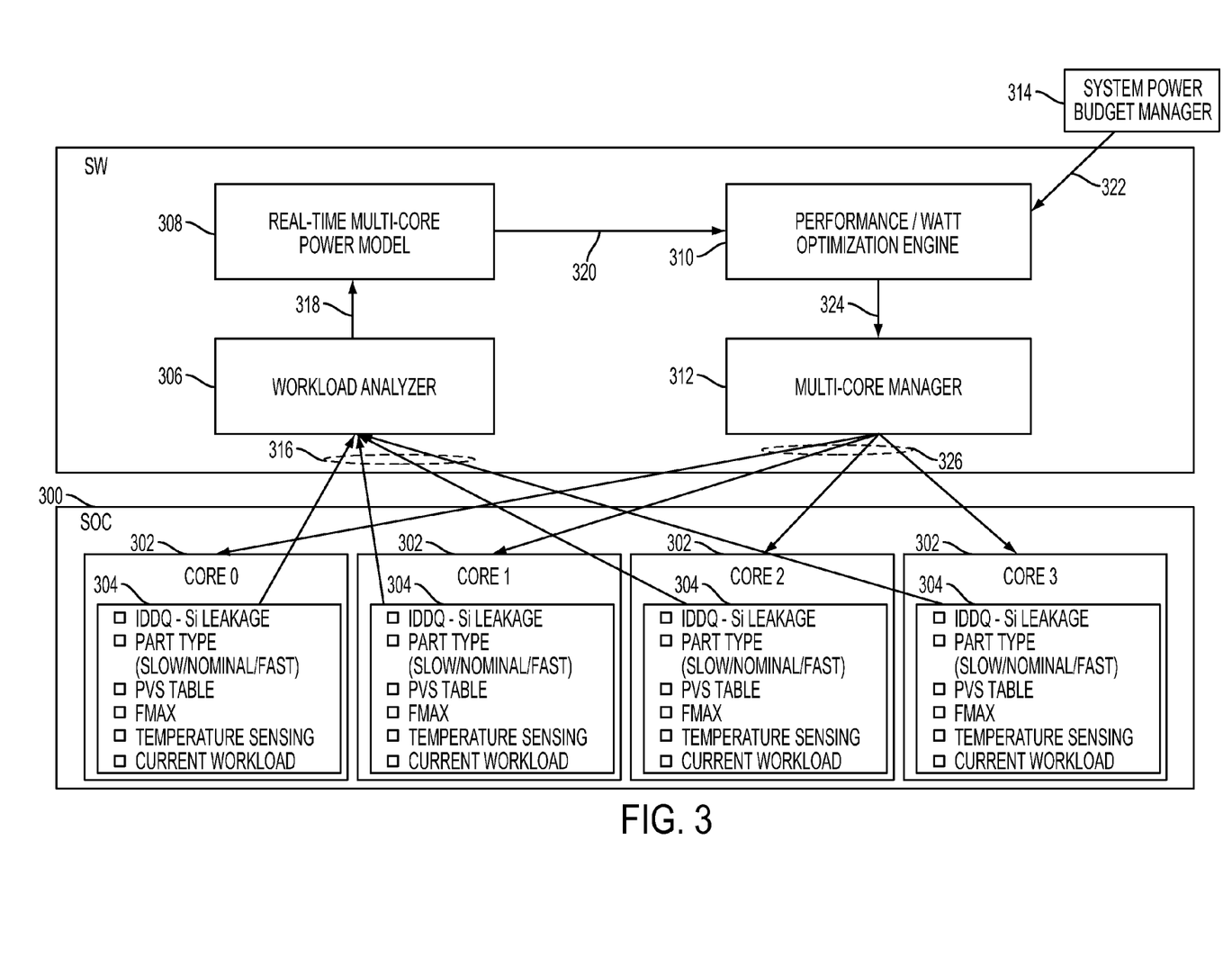
FIG. 3 is a block diagram illustrating an aspect intelligent multicore control on a multicore device.

FIG. 3 illustrates an aspect intelligent multicore control for controlling the number and particular ones of the multiple processor cores that should be active in a multicore IC. The multicore IC 300 in this example includes four processor cores 302, labeled Core 0, Core 1, Core 2, and Core 3. The number of processor cores 302 in any multicore IC 300 may vary, and may be more than or fewer than the four processor cores illustrated in FIG. 3. Each processor core 302 may be associated with a variety of processor core (or Si) information 304, which may be accessed from the processor core 302, or may be accessed from a separate processor (not shown) or memory (not shown). The processor core information 304 may include IDDQ testing results or a leakage current, a part type or processor core (or Si) speed (for example, slow, typical/nominal, or fast), a processor voltage scaling (PVS) table, a maximum clock frequency (Fmax), temperature readings, and a current workload.

To determine the optimal number of and which of the processor cores 302 to have active, a workload analyzer 306 may gather signals 316 having the processor core information 304 for each processor core 302. The workload analyzer 306 may be associated with a memory (not shown) that may be used to store certain static information from the processor cores 302. The static information of the processor cores 302 may be processor core information 304 that is constant, such as the leakage, the PVS table, the part type or speed, and the maximum clock frequency. Storing this static information may reduce the overhead of retrieving the static information for the processor cores 302, thereby reducing the time and power required to determine the optimal combination of processor cores 302. The static information may result from manufacturer specifications for and/or testing during the manufacturing process of the processor core 302. A manufacturer may store the static information on the processor core 302, separate processor, or memory during manufacturing such that the static information is contained within the multicore device prior to use of the processor core 302 by the user. The remaining processor core information 304 may be dynamic information, which may vary over time. Such dynamic information may include the temperature readings and workloads of the processor cores 302. Such dynamic information may be retrieved by the workload analyzer 306 as needed, for example, for each determination of the optimal combination of processor cores 302. The workload analyzer 306 may convert the current workload information of the processor cores 302 to a representative value of the workload for the processor cores 302. For example, the workload may be represented by MIPS, processor utilization, clock frequency, or some performance counter values. The current workload information and the representative value of the workload may be for the individual or a group of the processor cores 302.

A real-time multicore power model 308 may receive a signal 318 having some or all of the processor core information 304, including the converted workload representative value. The real-time multicore power model 308 may use the processor core information 304 to compute the power consumption for the current provided processor core information 304 and the processor core information 304 for a range of hypothetical cases. These hypothetical cases may include various combinations of the active processor cores 302 over a range of temperatures at a workload value. The real-time multicore power model 308 may create power maps, or data sets, consisting of the actual and hypothetical calculations and/or calculation results indicating relationships between power consumption and temperature for combinations of the processor cores 302 for the given workloads (or the given representative value of the workloads). The hypothetical cases may also include various combinations of active processor cores 302 over a range of workloads at a given temperature. The real-time multicore power model 308 may similarly create performance maps, or data sets, based on the current provided processor core information 304 and the processor core information 304 for a range of hypothetical cases. The calculations indicating relationships between power consumption and workload represented by, for example, throughput or instructions executed per second, for combinations of the processor cores 302 at selected temperatures. The power and performance maps may be output by the real-time multicore power model 308 along with the factors used to determine the maps, such as temperatures and representative workload values, and some or all of the processor core information 304 as a signal 320.

The real-time multicore power model 308 may create either the power or performance maps depending on a current optimization policy which may be one of lowest-power for a given workload or highest-performance for a given power budget. In another aspect, whether the real-time multicore power model 308 creates the power map or performance map may depend on certain factors. For example, a temperature threshold may be applied to determine which map to create. When the temperature readings are below the threshold, the real-time multicore power model 308 may create the power map to help determine the lowest power consumption for a given workload. This may allow the multicore device to meet the workload needs while keeping the power consumption as low as possible, thereby extending the life of the battery. Keeping the power consumption as low as possible also results in keeping the temperature as low as possible while still achieving the performance goals for the workload. When the temperature readings are above the threshold, the real-time multicore power model 308 may create the performance map to help determine the best performance, or highest workload at the lowest power consumption, for a given power budget or level. This may allow the multicore device to provide the highest workload with the least amount of power, thereby having the least impact on raising the temperature or even maintaining or reducing the temperature while providing the best user experience within these parameters.

In creating the maps, the real-time multicore power model 308 may use the processor core information 304 of each processor core 302 to calculate the results based on various combinations of the individual processor cores 302. For example, the real-time multicore power model 308 may select to combine processor cores 302 having the lowest temperatures, the least leakage, the highest speed, and/or the least workload. In another aspect, the real-time multicore power model 308 may make certain assumptions in its calculations. Such assumptions may include each processor core 302 belonging to the same multicore IC 300 may share certain characteristics, like the processor core static information. Other aspects may call for the real-time multicore power model 308 to abide by certain rules in creating the combinations of processor cores 302, such as processor core combinations must include only adjacent processor cores 302 (e.g. Core 0 and Core 1; Core 1 and Core 2; Core 2 and Core 3; Core 3 and Core 4; Core 0, Core 1 and Core 2; Core 1, Core 2 and Core 3; and Core 2, Core 3 and Core 4), or only processor cores 302 of the same type may be combined. Adjacent processor cores 302 do not have to be physically adjacent, they may be designated as adjacent by rule.

A performance/watt optimization engine 310 may receive the maps and factors from the real-time multicore power model 308 as signal 320, and also a power budget from a system power budget manager 314 as signal 322. The factors may include the factors used to determine the maps, such as temperatures and representative workload values, and some or all of the processor core information 304. The optimization engine 310 may execute a performance optimization algorithm in a multi-dimensional space to determine or identify the optimal configuration of processor cores 302 for the current workload. The configuration may include the number of active and/or inactive processor cores 302, and/or which processor cores 302 should be designated to be active and/or inactive. The number of processor cores 302 to have active may be derived from the performance optimization algorithm using the maps, and in some instances the factors as well. Like the real-time multicore power model 308, the optimization engine 310 may make any combination of processor cores 302 based on individual information, based on certain assumptions, or based on a set of rules. Choosing the active and/or inactive processor cores 302 may be based on any single part or combination of the processor core information 304 of individual processor cores 302. For example, the optimization engine 310 may choose active processor cores 302 with the lowest leakage, the lowest temperature, and/or lowest voltage level for a given frequency. The optimization engine 310 may identify how many and/or which processor cores 302 to be active and/or inactive for a unit measurement, such as time, workload, power consumption amount, and/or temperature level.

A multicore manager 312 may receive a signal 324 having the identified processor core information from the optimization engine 310. The multicore manager 312 may control an activity state for each processor core 302, thereby controlling how many and/or which processor cores 302 are active/inactive for the unit measurement. In an aspect, the multicore manager 312 may signal the multicore IC 300 or the individual processor cores 302 with a state signal 326 that induces an active state and/or an inactive state in a particular or a group of processor cores 302. In an aspect, the multicore manager 312 controls or interacts with a scheduler (not shown) to schedule processes only for processor cores 302 deemed to be active by the optimization engine 310. In another aspect, the multicore manager 312 controls or interacts with the scheduler to schedule processes for the active processor cores 302 and to avoid scheduling processes for processor cores 302 deemed to be inactive by the optimization engine 310.

In an aspect, a multicore device may have one or more multicore ICs 300. The multicore device may further include one or more of each of the workload analyzer 306, the real-time multicore power model 308, the optimization engine 310, and the multicore manager 312. Each of these components may be paired with one or more multicore ICs 300.

The workload analyzer 306, the real-time multicore power model 308, the optimization engine 310, and the multicore manager 312 may each be implemented as software stored on a memory (see FIG. 8) of the multicore device and executed by a processor (see FIG. 8) of the multicore device.

Figure 4:
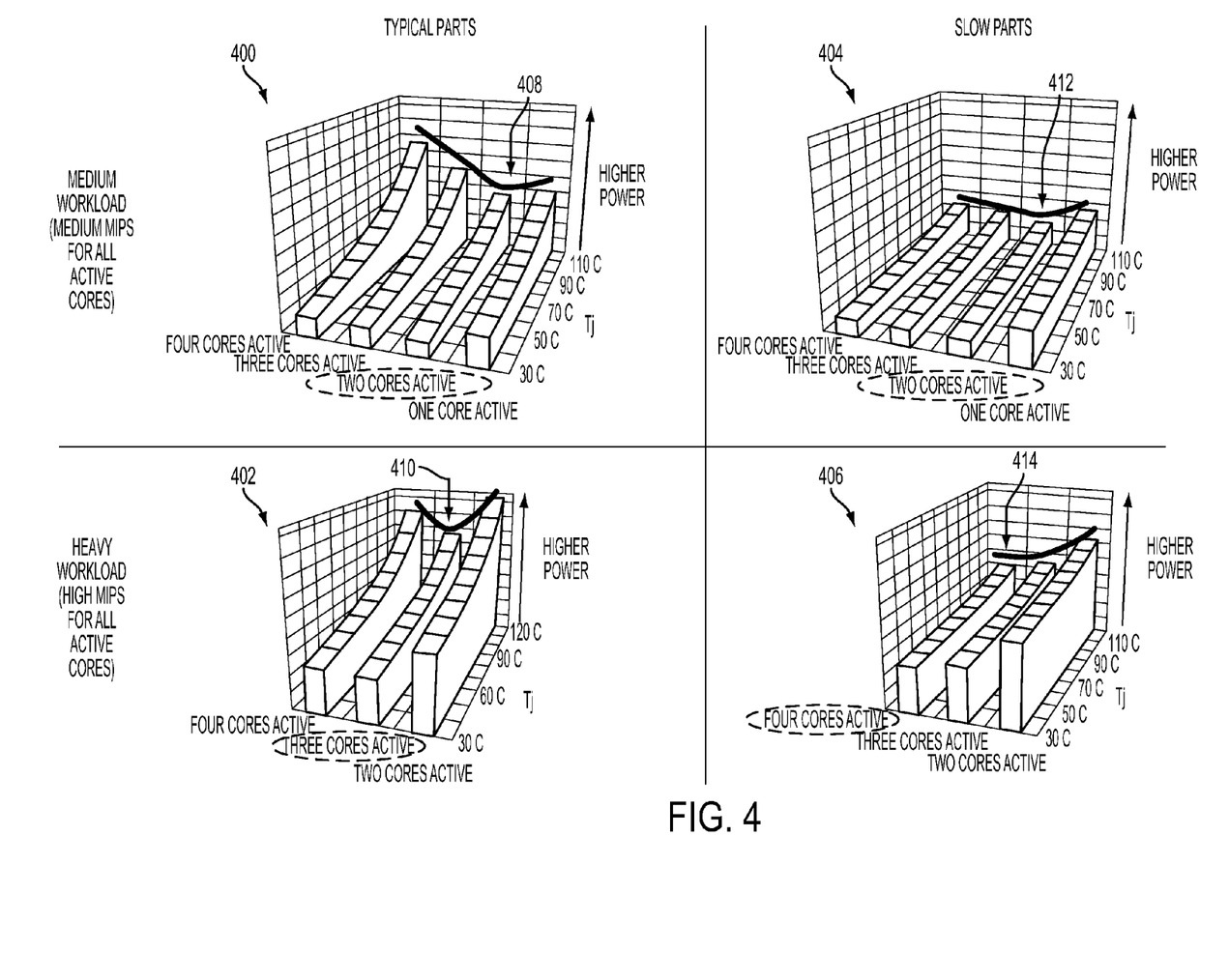
FIG. 4 is a series of graphs of example power maps for intelligent multicore control for a multicore device.

FIG. 4 illustrates examples of aspect graphical power maps for intelligent multicore control for a multicore device. The graphical representations 400, 402, 404, and 406 depict four circumstances resulting in power maps. Each graphical representation 400, 402, 404, and 406 includes individual graphs representing the power consumption calculated by the real-time multicore power model for a designated number of processor cores at a given representative workload value over a range of temperatures. A graphical representation of a first exemplary power map 400 is for a typical type multicore IC and a medium work load (e.g. a medium MIPS number). For the exemplary multicore IC involved in the creation of this first exemplary power map, one to four processor cores may be able to handle the workload. An arrow 408 indicates that at approximately 110 degrees Celsius, using two active processor cores results in the lowest power consumption while still being able to handle the designated workload.

A graphical representation of a second exemplary power map 402 is also for a typical type multicore IC, but with a heavy work load (e.g. a high MIPS number). In this instance, the exemplary multicore IC used to generate this second exemplary power map may need two to four processor cores to handle the workload. An arrow 410 in this case indicates that at approximately 120 degrees Celsius, using three active processor cores results in the lowest power consumption, while still being able to handle the designated workload.

A graphical representation of a third exemplary power map 404 differs from the previous two graphical representations 400, 402, because it is for a slow type multicore IC, but uses the same workload as the graphical representation of the first exemplary power map 400. In this example, one to four processor cores may handle the workload, and an arrow 412 indicates that using two active processor cores results in the lowest power consumption for handling the workload at approximately 110 degrees Celsius.

A graphical representation of a fourth exemplary power map 406 is for a slow type multicore IC, but uses the same heavy workload as the graphical representation of the second exemplary power map 402. In this example, two to four processor cores may handle the workload, and an arrow 414 indicates that using four active processor cores results in the lowest power consumption for handling the workload at approximately 110 degrees Celsius.

Figure 5A:
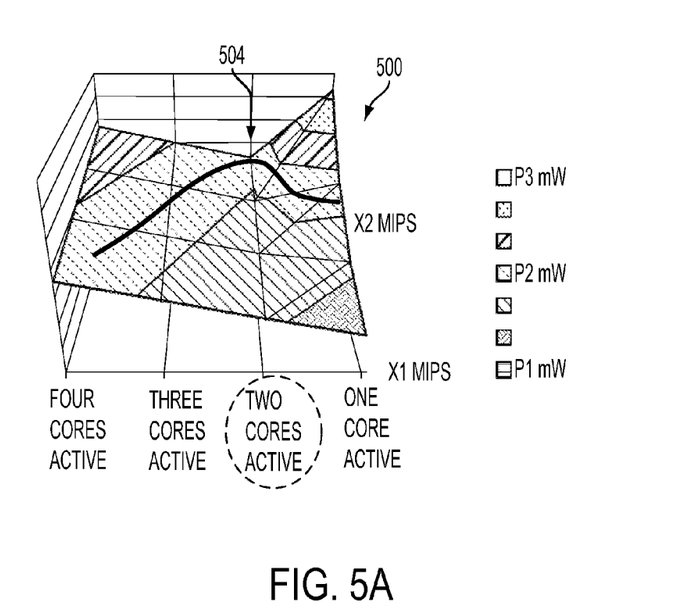
FIG. 5A is a graph of an aspect performance map for intelligent multicore control for a multicore device.
Figure 5B:
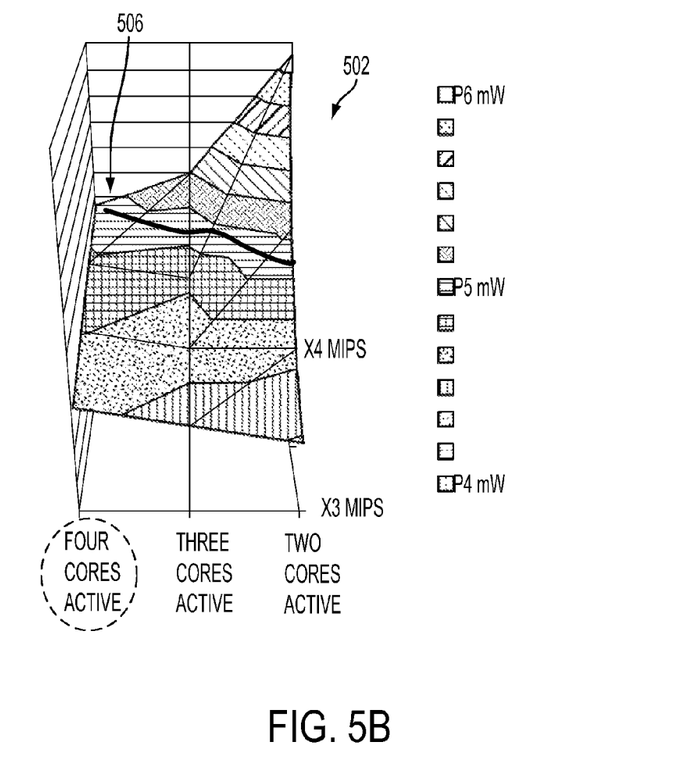
FIG. 5B is a graph of an aspect performance map for intelligent multicore control for a multicore device.

FIGS. 5A and 5B illustrate aspect performance maps for intelligent multicore control for a multicore device. The graphical representations 500 and 502 depict two circumstances resulting in performance maps. Each graphical representation includes a graph representing the power consumption calculated by the real-time multicore power model for a designated number of processor cores for various workloads. The temperature (not shown) in these calculations may be a constant. A graphical representation of a first exemplary performance map 500 is for a typical type multicore IC. For the exemplary multicore IC involved in the creation of this performance map, one to four processor cores may be able to handle the variable workloads. An arrow 504 indicates that using two active processor cores results in the best performance of X2 MIPS at a power budget of P2 mW, while one active processor core can handle fewer MIPS, and three or four active processor cores can handle even fewer MIPS at approximately the same power budget.

A graphical representation of a second exemplary performance map 502 is also for a typical type multicore IC, having two to four processor cores able to handle the variable workloads. An arrow 506 in this case indicates that using four active processor cores results in the best performance of X4 MIPS at a power budget of P5 mW, while three active processor cores can handle fewer MIPS and two active cores can handle even fewer MIPS at approximately the same power budget.

Figure 6:
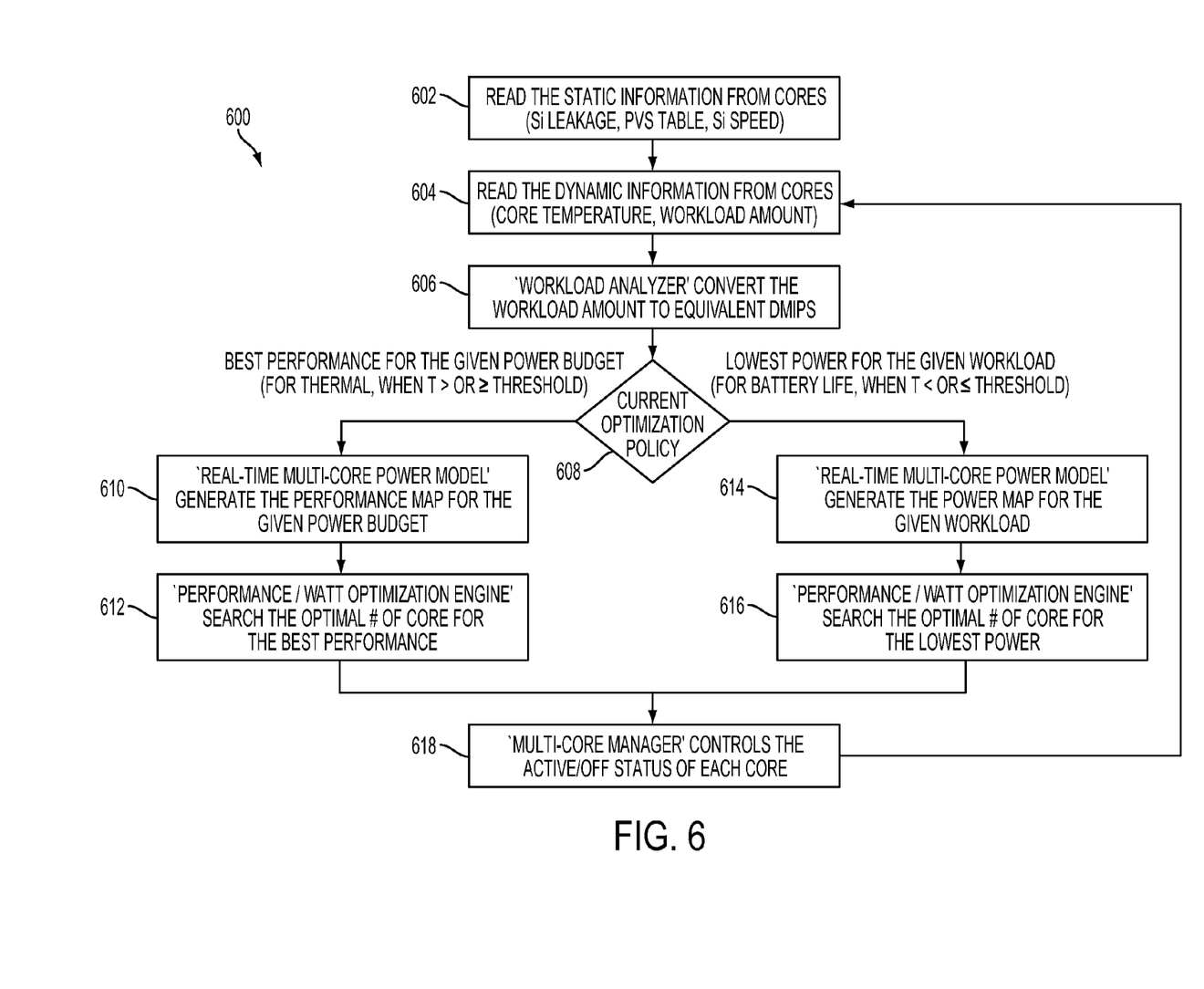
FIG. 6 is a process flow diagram illustrating an aspect intelligent multicore control method for a multicore device.

FIG. 6 is a process flow diagram illustrating an aspect intelligent multicore control method 600 for a multicore device. When the multicore device has multiple multicore ICs, the multicore device may select to execute some or all of the blocks described herein for the processor cores of particular multicore ICs. For example, a multicore device may include a multicore IC for general computational task and another multicore IC specifically for multimedia processing and rendering. Specific tasks may be designated for the different multicore ICs. When the multicore device executes the intelligent multicore control method 600, it may do so for a workload of specific tasks for a particular multicore IC. In such instances, the multicore device may select the appropriate multicore IC for the workload and execute the blocks of the intelligent multicore control method 600 with respect to the processor cores of the selected multicore IC.

In block 602 the multicore device may read the static information associated with some or all of the processor cores of the multicore device. The static information of the processor cores may be processor core information that is constant, such as the leakage, the PVS (processor voltage scaling) table, and the part type or Si speed. In block 604 the multicore device may read dynamic information associated the with processor cores of the multicore device. The dynamic information may vary over time, and may include the temperature readings and workloads of the processor cores. In block 606 the multicore device may convert the current workload reading to a representative workload value. For example, the workload may be represented by MIPS, processor utilization, operating clock frequency, or some performance counter value.

In determination block 608 the multicore device may determine a relationship of the temperature readings to a temperature threshold by comparing the temperature readings to the temperature threshold. The determination of this relationship may be made in various ways. The multicore device may compare the temperature readings of each processor core and the temperature threshold. The determination may be made on a processor core by processor core basis, and an overall determination may be made by a majority rule. For example, when the majority of processor core temperature readings are less than the temperature threshold, the entire group of processor cores is treated as having temperature readings below the threshold for the purposes of the determination in determination block 608. In an aspect, each processor core may be treated separately for the purposes of the determination in determination block 608. A further aspect may use a mean or median temperature of the group of processor cores to compare with the temperature threshold and treat the processor cores as a group for the purposes of the determination in determination block 608.

Depending on the determined relationship(s), the multicore device may calculate power maps or performance maps. When the determination in determination block 608 is that the temperature readings for the processor cores, either as a group or individually, are greater than the temperature threshold, in block 610 the multicore device may calculate a performance map to be used to achieve the optimal or best performance for the given power budget. In an aspect, when the temperature readings are equal to the threshold, the multicore device may calculate the performance map in block 610. In block 612 the multicore device may identify the configuration of processor cores that may optimize the performance for the given power budget. In an aspect, the configuration may include the number of active/inactive processor cores and/or which active/inactive processor cores may optimize the performance for the given power budget. In block 618 the multicore device may control the activity state of the processor cores, thereby controlling the number and/or which processor cores are active and/or inactive to execute the workload within the parameters of achieving the best performance for the given power budget.

When the determination in determination block 608 is that the temperature readings for the processor cores, either as a group or individually, are less than the temperature threshold, in block 614 the multicore device may calculate a power map to be used to achieve the optimal or lowest power for the given workload. In an aspect, when the temperature readings are equal to the threshold the multicore device may calculate the power map in block 614. In block 616 the multicore device may identify the configuration of processor cores that may optimize power for the given workload. In an aspect, the configuration may include the number of active/inactive processor cores and/or which active/inactive processor cores may optimize power for the given workload. In block 618 the multicore device may control the activity state of the processor cores, thereby controlling the number and/or which processor cores are active and/or inactive to execute the workload within the parameters of achieving the lowest power for the given workload.

The multicore device may repeatedly perform the intelligent multicore control method 600 for each workload of processes to be executed. In an aspect, it may be unnecessary to repeat block 602 since the static information may be unchanging. In such cases, the multicore device may repeat the intelligent multicore control method 600 from block 604 by reading the dynamic information of the processor cores.

Figure 7:
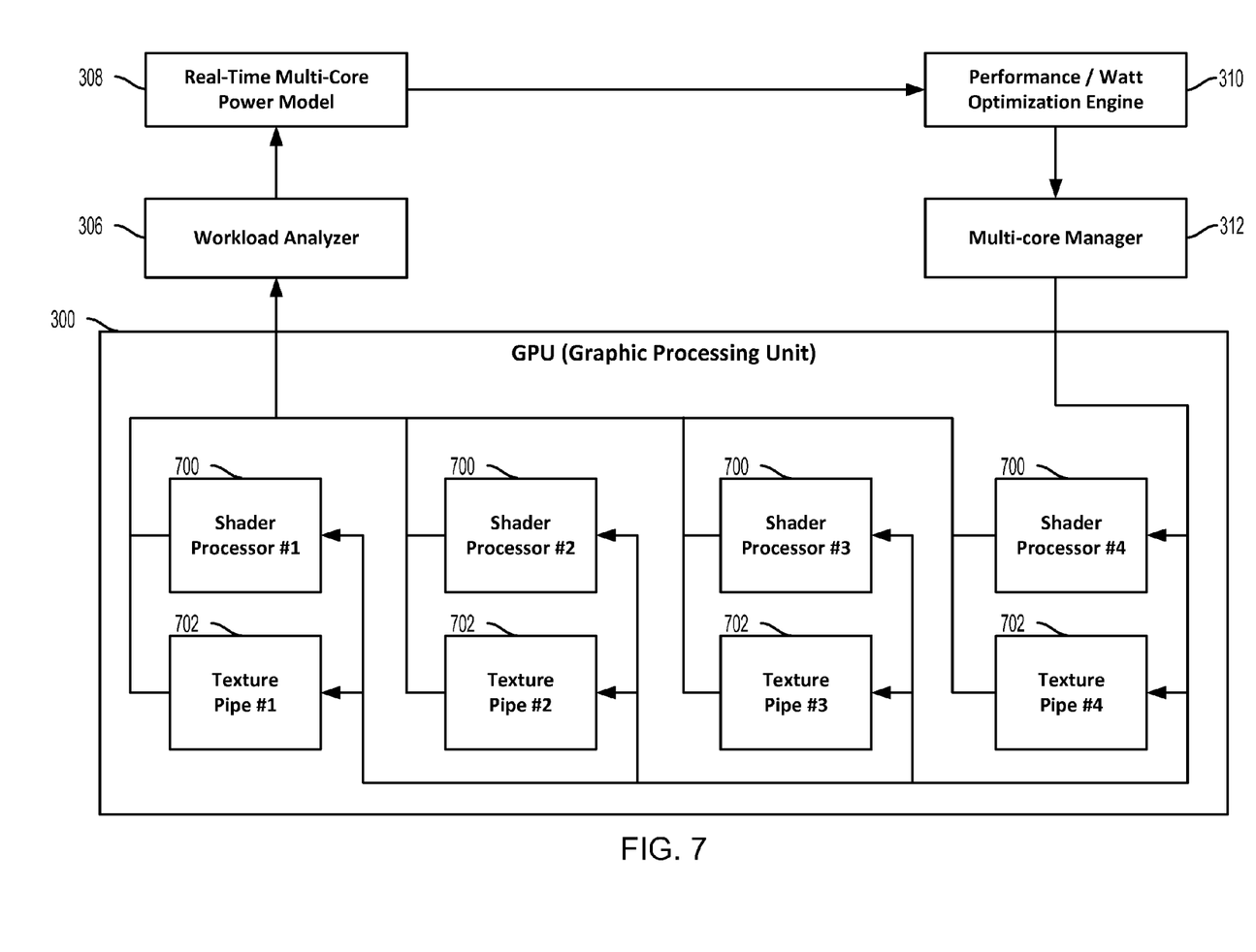
FIG. 7 is a component block diagram illustrating an example of a multicore graphics integrated circuit for use with intelligent multicore control.

FIG. 7 provides a simplified component block diagram of a multicore IC 300 architecture suitable for use with intelligent multicore control as described herein. The multicore IC 300s in the example shown in FIG. 7 are graphics processing units (GPUs) having multiple processor cores, a group of which are shader processors (SP) 700 and a group of which are texture pipes (TP) 702, as may be suitable for a high end computing device (e.g., a desktop computer). The shader processors 700 and the texture pipes 702 may be arranged to execute processes in parallel with each other. The intelligent multicore control may be implemented for any set of processor cores arranged to execute processes in parallel with each other. The processor cores may all be within the multicore IC 300. In an aspect, the intelligent multicore control may be used to manage processor cores across similar multicore ICs 300. For example, a potential future multicore device having several multimedia multicore ICs 300. Each of the multimedia multicore ICs 300 may have similar processing capabilities in which they process multimedia tasks. The multicore device may use the intelligent multicore control to select processor cores from more than one multimedia multicore IC 300 to execute a given workload. In another aspect, the multicore device may use the intelligent multicore control to optimize a group of processor cores within one multicore IC 300 with respect to another similar multicore IC 300. An example using the several multimedia multicore ICs 300, as described in the previous example, may involve the multicore device using the intelligent multicore control to select processor cores from one multimedia multicore IC 300 out of a group of multimedia multicore ICs 300 to execute a given workload.

FIG. 7 further illustrates that each processor core, shader processors 700, and texture pipes 702 may be connected to the workload analyzer 306 and the multicore manager 312. This illustration is a simplification of a relationship between the multicore manager 312 and the shader processors 700, and texture pipes 702, because shader processors 700, which are tightly integrated with texture pipes 702, may be driven purely by hardware blocks that accomplish the distribution of shader workloads. The work analyzer 306 may be connected to the real-time multicore power model 308, which may be connected to the performance/watt optimization engine 310, which may be connected to the multicore manager 312. As such, the components illustrated in FIG. 7 may be capable of implementing intelligent multicore control as described herein.

The various aspects may be implemented in modular shader processor/texture pipe units. This architecture allows for the creation of GPU variations that may vary in shader and texture processing capabilities. Shader processing is just one of many steps in the graphics processing performed by GPUs, and thus the discussions above regarding shader processor/texture pipe units addresses only a portion of the complete working core. Shader processor/texture pipe units may be driven purely by the preceding hardware blocks, and may not be individually controlled from software. However, future computing system architectures may permit shader processor/texture pipe units to be controlled from software.

Figure 8:
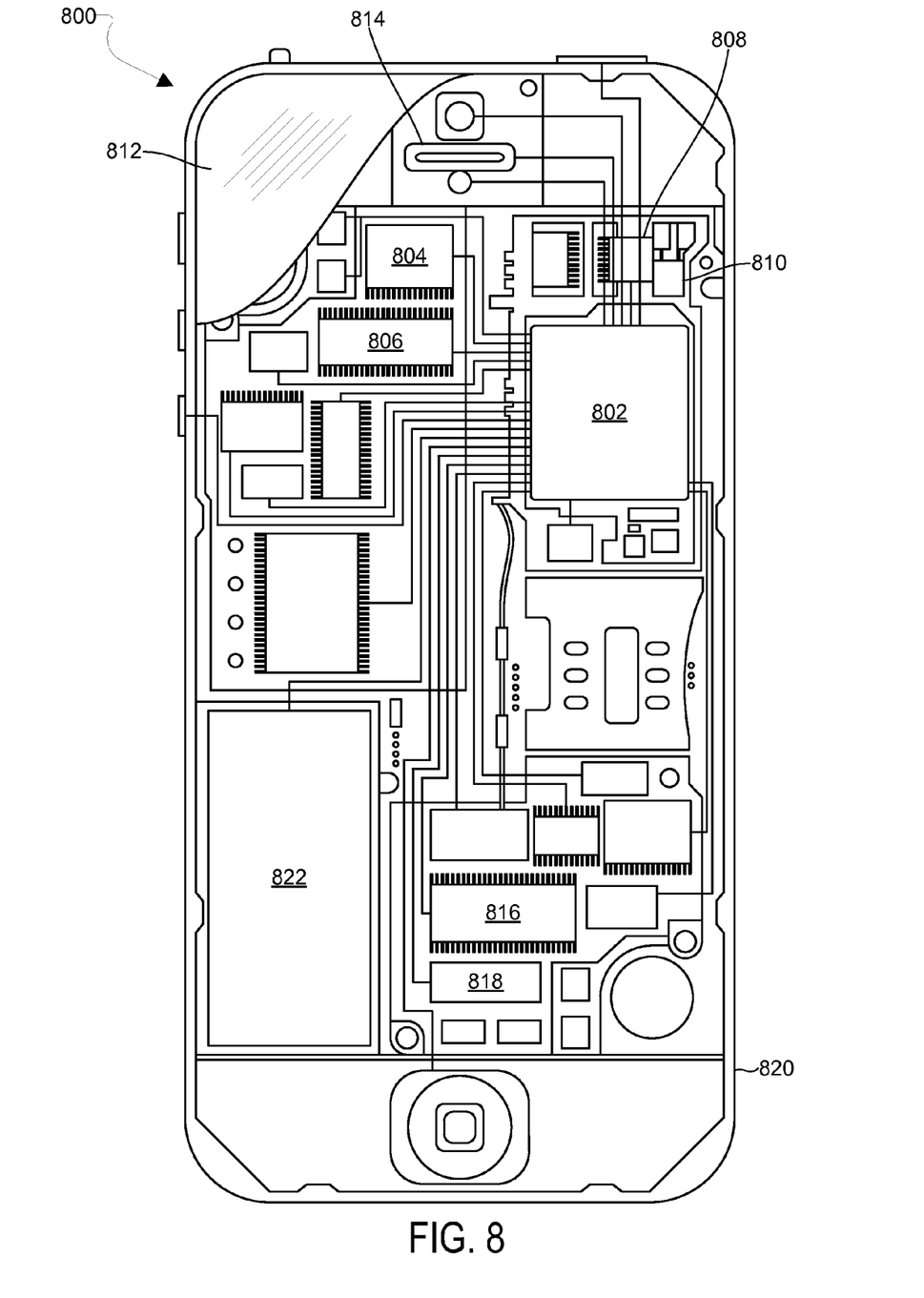
FIG. 8 is a component diagram illustrating an example multicore device suitable for use with an aspect intelligent multicore control method.

FIG. 8 illustrates an aspect multicore device 800 for using intelligent multicore control. In various embodiments, the multicore device 800 may include a processor 802 coupled to a touchscreen controller 804 and an internal memory 806. The processor 802 may be one or more multicore ICs designated for general or specific processing tasks. The internal memory 806 may be volatile or non-volatile memory, and may also be secure and/or encrypted memory, or unsecure and/or unencrypted memory, or any combination thereof. The touchscreen controller 804 and the processor 802 may also be coupled to a touchscreen panel 812, such as a resistive-sensing touchscreen, capacitive-sensing touchscreen, infrared sensing touchscreen, etc. The multicore device 800 may have one or more radio signal transceivers 808 (e.g., Peanut®, Bluetooth®, Zigbee®, Wi-Fi, RF radio) and antennae 810, for sending and receiving, coupled to each other and/or to the processor 802. The transceivers 808 and antennae 810 may be used with the above-mentioned circuitry to implement the various wireless transmission protocol stacks and interfaces. The multicore device 800 may include a cellular network wireless modem chip 816 that enables communication via a cellular network and is coupled to the processor. The multicore device 800 may include a peripheral device connection interface 818 coupled to the processor 802. The peripheral device connection interface 818 may be singularly configured to accept one type of connection, or multiply configured to accept various types of physical and communication connections, common or proprietary, such as USB, FireWire, Thunderbolt, or PCIe. The peripheral device connection interface 818 may also be coupled to a similarly configured peripheral device connection port (not shown). The multicore device 800 may also include speakers 814 for providing audio outputs. The multicore device 800 may also include a housing 820, constructed of a plastic, metal, or a combination of materials, for containing all or some of the components discussed herein. The multicore device 800 may include a power source 822 coupled to the processor 802, such as a disposable or rechargeable battery. The rechargeable battery may also be coupled to the peripheral device connection port to receive a charging current from a source external to the multicore device 800.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic circuit, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for multicore control of a plurality of processor cores of a multicore integrated circuit, comprising:
    comparing temperature readings of the plurality of processor cores to a temperature threshold;
    calculating a map for the plurality of processor cores based on processor core information and a plurality of hypothetical cases, wherein a first map is calculated in response to the temperature readings of the plurality of processor cores being less than the temperature threshold and a second map is calculated in response to the temperature readings of the plurality of processor cores being greater than the temperature threshold;
    identifying, from the first map, a first configuration of processor cores to optimize power consumption for a given workload;
    identifying, from the second map, a second configuration of processor cores to optimize performance for a given power budget; and
    controlling an activity state for each processor core of the plurality of processor cores based on the identified configuration.

2. The method of claim 1, wherein calculating the map for the plurality of processor cores based on the processor core information and the plurality of hypothetical cases comprises:
    calculating the first map indicating relationships between power consumption and temperature for combinations of the plurality of processor cores for a given representative value of the given workload; and
    calculating the second map indicating relationships between power consumption and workload for combinations of the plurality of processor cores for a given temperature.

3. The method of claim 1, wherein the first and second configurations of processor cores indicate a number of active processor cores.

4. The method of claim 1, wherein the first and second configurations of processor cores indicate which processor cores of the plurality of processor cores are active processor cores.

5. The method of claim 1, wherein the first and second configurations of processor cores include the processor cores with a lowest leakage, a lowest temperature, or a lowest voltage level for a given frequency.

6. The method of claim 1, further comprising:
    reading the processor core information associated with each processor core, wherein the processor core information includes a leakage current, a processor core speed, a processor voltage setting table, a maximum clock frequency, a temperature reading, and a current workload; and
    converting the current workload into a representative value of the current workload.

7. The method of claim 6, wherein the processor core information comprises dynamic information including the temperature reading and the current workload,
    the method further comprising repeatedly reading the dynamic information.

8. The method of claim 1, wherein the processor cores of the multicore integrated circuit comprise one or more processor core types selected from the group including a central processing unit, a shader processor of a graphics processing unit, a texture pipe of the graphics processing unit, or a digital signal processor.

9. An apparatus, comprising:
    a multicore integrated circuit having a plurality of processor cores, wherein the multicore integrated circuit is configured with processor-executable instructions to perform operations comprising:
        comparing temperature readings of the plurality of processor cores to a temperature threshold;
        calculating a map for the plurality of processor cores based on processor core information and a plurality of hypothetical cases, wherein a first map is calculated in response to the temperature readings of the plurality of processor cores being less than the temperature threshold and a second map is calculated in response to the temperature readings of the plurality of processor cores being greater than the temperature threshold;

identifying, from the first map, a first configuration of processor cores to optimize power consumption for a given workload;

identifying, from the second map, a second configuration of processor cores to optimize performance for a given power budget; and controlling an activity state for each processor core of the plurality of processor cores based on the identified configuration.

10. The apparatus of claim 9, wherein the multicore integrated circuit is configured with processor-executable instructions to perform operations such that calculating the map for the plurality of processor cores based on the processor core information and the plurality of hypothetical cases comprises:

calculating the first map indicating relationships between power consumption and temperature for combinations of the plurality of processor cores for a given representative value of the given workload; and calculating the second map indicating relationships between power consumption and workload for combinations of the plurality of processor cores for a given temperature.

11. The apparatus of claim 9, wherein the first and second configurations of processor cores indicate a number of active processor cores.

12. The apparatus of claim 9, wherein the first and second configurations of processor cores indicate which processor cores of the plurality of processor cores are active processor cores.

13. The apparatus of claim 9, wherein the first and second configurations of processor cores include the processor cores with a lowest leakage, a lowest temperature, or a lowest voltage level for a given frequency.

14. The apparatus of claim 9, wherein the multicore integrated circuit is configured with processor-executable instructions to perform operations further comprising:

reading the processor core information associated with each processor core, wherein the processor core information includes a leakage current, a processor core speed, a processor voltage setting table, a maximum clock frequency, a temperature reading, and a current workload; and converting the current workload into a representative value of the current workload.

15. The apparatus of claim 14, wherein the processor core information comprises dynamic information including the temperature reading and the current workload, the multicore integrated circuit is configured with processor-executable instructions to perform operations further comprising repeatedly reading the dynamic information.

16. The apparatus of claim 9, wherein the processor cores of the multicore integrated circuit comprise one or more processor core types selected from the group including a central processing unit, a shader processor of a graphics processing unit, a texture pipe of the graphics processing unit, or a digital signal processor.

17. An apparatus for multicore control of a plurality of processor cores of a multicore integrated circuit, comprising:

means for comparing temperature readings of the plurality of processor cores to a temperature threshold;

means for calculating a map for the plurality of processor cores based on processor core information and a plurality of hypothetical cases, wherein a first map is calculated in response to the temperature readings of the plurality of processor cores being less than the temperature threshold and a second map is calculated in response to the temperature readings of the plurality of processor cores being greater than the temperature threshold;

means for identifying, from the first map, a first configuration of processor cores to optimize power consumption for a given workload;

means for identifying, from the second map, a second configuration of processor cores to optimize performance for a given power budget; and means for controlling an activity state for each processor core of the plurality of processor cores based on the identified configuration.

18. The apparatus of claim 17, wherein means for calculating the map for the plurality of processor cores based on the processor core information and the plurality of hypothetical cases comprises:

means for calculating the first map indicating relationships between power consumption and temperature for combinations of the plurality of processor cores for a given representative value of the given workload; and means for calculating the second map indicating relationships between power consumption and workload for combinations of the plurality of processor cores for a given temperature.

19. The apparatus of claim 17, wherein the first and second configurations of processor cores indicate a number of active processor cores.

20. The apparatus of claim 17, wherein the first and second configurations of processor cores indicate which processor cores of the plurality of processor cores are active processor cores.

21. The apparatus of claim 17, wherein the first and second configurations of processor cores include the processor cores with a lowest leakage, a lowest temperature, or a lowest voltage level for a given frequency.

22. The apparatus of claim 17, further comprising:

means for reading the processor core information associated with each processor core, wherein the processor core information includes a leakage current, a processor core speed, a processor voltage setting table, a maximum clock frequency, a temperature reading, and a current workload; and means for converting the current workload into a representative value of the current workload.

23. The apparatus of claim 22, wherein the processor core information comprises dynamic information including the temperature reading and the current workload, the apparatus further comprising means for repeatedly reading the dynamic information.

24. The apparatus of claim 17, wherein the processor cores of the multicore integrated circuit comprise one or more processor core types selected from the group including a central processing unit, a shader processor of a graphics processing unit, a texture pipe of the graphics processing unit, or a digital signal processor.

25. A non-transitory processor-readable medium having stored thereon processor-executable software instructions configured to cause a multicore integrated circuit to perform operations comprising:
- comparing temperature readings of a plurality of processor cores to a temperature threshold;
- calculating a map for the plurality of processor cores based on processor core information and a plurality of hypothetical cases, wherein a first map is calculated in response to the temperature readings of the plurality of processor cores being less than the temperature threshold and a second map is calculated in response to the temperature readings of the plurality of processor cores being greater than the temperature threshold;
- identifying, from the first map, a first configuration of processor cores to optimize power consumption for a given workload;
- identifying, from the second map, a second configuration of processor cores to optimize performance for a given power budget; and
- controlling an activity state for each processor core of the plurality of processor cores based on the identified configuration.

26. The non-transitory processor-readable medium of claim 25, wherein the stored processor-executable software instructions are configured to cause the multicore integrated circuit to perform operations such that calculating the map for the plurality of processor cores based on the processor core information and the plurality of hypothetical cases comprises:
- calculating the first map indicating relationships between power consumption and temperature for combinations of the plurality of processor cores for a given representative value of the given workload; and
- calculating the second map indicating relationships between power consumption and workload for combinations of the plurality of processor cores for a given temperature.

27. The non-transitory processor-readable medium of claim 25, wherein the stored processor-executable software instructions are configured to cause the multicore integrated circuit to perform operations further comprising:
- reading the processor core information associated with each processor core, wherein the processor core information includes a leakage current, a processor core speed, a processor voltage setting table, a maximum clock frequency, a temperature reading, and a current workload; and
- converting the current workload into a representative value of the current workload.

28. The non-transitory processor-readable medium of claim 27, wherein the processor core information comprises dynamic information including the temperature reading and the current workload,
- the stored processor-executable software instructions are configured to cause the multicore integrated circuit to perform operations further comprising repeatedly reading the dynamic information.

* * * * *